United States Patent
Krouse et al.

(10) Patent No.: US 8,303,242 B2
(45) Date of Patent: *Nov. 6, 2012

(54) MACHINE FOR INCREASED HYDRO POWER GENERATION

(75) Inventors: Wayne F. Krouse, Houston, TX (US); Frederick E. Becker, Reading, MA (US); Andrew R. Provo, West Fairfee, VT (US)

(73) Assignee: Hydro Green Energy, LLC, Westmont, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/325,283

(22) Filed: Dec. 14, 2011

(65) Prior Publication Data

US 2012/0107090 A1   May 3, 2012

Related U.S. Application Data

(63) Continuation of application No. 12/286,009, filed on Sep. 27, 2008, now Pat. No. 8,087,875.

(60) Provisional application No. 60/995,774, filed on Sep. 28, 2007.

(51) Int. Cl.
*F01D 11/00* (2006.01)

(52) U.S. Cl. ............ 415/12; 415/26; 415/126; 415/148; 415/156; 416/39; 416/240

(58) Field of Classification Search ............... 415/12, 415/13, 26, 126, 128, 148, 150, 156, 149.1, 415/167, 149.2; 416/39, 240
See application file for complete search history.

(56) References Cited

U.S. PATENT DOCUMENTS

| 8,004,101 B2* | 8/2011 | Aaron ............................. 290/44 |
| 2002/0004004 A1* | 1/2002 | Fledersbacher et al. ...... 415/151 |

* cited by examiner

*Primary Examiner* — Gary F. Paumen

(57) ABSTRACT

A hydropower generating turbine having an impeller housing disposed to receive water, at least one impeller disposed within the impeller housing, at least one adjustable duct pivotally connected to the impeller housing, and, where the duct has a plurality of duct leafs, wherein the duct leafs articulate and cause the duct to converge and diverge for selectively disposing a fluid about the impeller. The ducts may be inflow or outflow ducts, and the turbine may react to a change in the fluid and alter the shape of the impeller. Further, the turbine may have an automated controller where variable change in the flow is detected by a sensor and transmitted to the automated controller to cause a directional shift in the multidirectional turbine.

20 Claims, 6 Drawing Sheets

MACHINE FOR INCREASED HYDRO POWER GENERATION

CROSS REFERENCE TO RELATED APPLICATIONS

This application is a continuation of U.S. patent application Ser. No. 12/286,009 filed Sep. 27, 2008 entitled "Machine for Increase Hydro Power Generation" now issued as U.S. Pat. No. 8,087,875 and claims the benefit of U.S. Provisional Application No. 60/995,774, filed 28 Sep. 2007, and titled "A machine for increased hydro power generation and process for optimal control of pressure drop across an in situ ducted hydro kinetic turbine."

BACKGROUND OF THE INVENTION

1. Field of the Invention

The present invention relates to hydrokinetic power generating turbines. In particular, the present invention relates to multidirectional hydrokinetic power generating turbines that include adjustable ducting and stators.

2. Description of Related Art

Conventional hydropower systems have employed a variety of devices to attain optimal usage of fluid flow. Some hydropower systems currently include ducts with wide inputs and a variety of outputs to capture the maximum amount of flow channeled to the impellers situated in a current. Other hydropower systems employ less expansive ducting in hopes of building head so that a maximum amount of fluid can be channeled through the hydropower system in order to attain a maximum amount of energy. Still other hydropower systems include various ducts, some of which induce and create various flow regimes to create power. Often hydropower systems require customized ducting to attain maximum efficiency in the situational environment in which they are placed. For example a river which dispels over 10,000 gallons per minute will most likely employ ducting which is designed to encompass a different amount of water than a river which dispels less than 100 gallons per minute. When duct sizes are not modified, optimal efficiency is attained by employing impellers, rotors, and stators along various positions within the ducts. Some hydropower systems use a combination of ducting shape and impeller position in hopes of achieving a maximum power input. Nonetheless, modifications to ducting and impellers must be made to accommodate a wide variety of environment specific needs.

When hydropower systems employ the necessary modifications to ducting and impellers to accommodate natural and manmade settings, including as rivers, streams, and dams, they often require movement and repositioning over time because of changes in flow, alterations in currents, and the like. Some times, ducts need to be removed and relocated to alternative positions because the flow rate attained no longer achieves maximum efficiency. Moving and repositioning ducts as well as impellers to attain optimal efficiency is both expensive and labor intensive.

Thus there is a need for multidirectional hydrokinetic power generating turbine, that adjusts to a variety of flow rates.

Although prior art systems represent great strides in the area of turbine generation, many shortcomings remain.

BRIEF DESCRIPTION OF THE DRAWINGS

The novel features believed to be characteristic of the invention are set forth in the appended claims. However, the invention itself, as well as a preferred mode of use and further objectives and advantages thereof, will best be understood by reference to the following detailed description when read in conjunction with the accompanying drawings, wherein:

DETAILED DESCRIPTION OF THE PREFERRED EMBODIMENT

Figure 1:
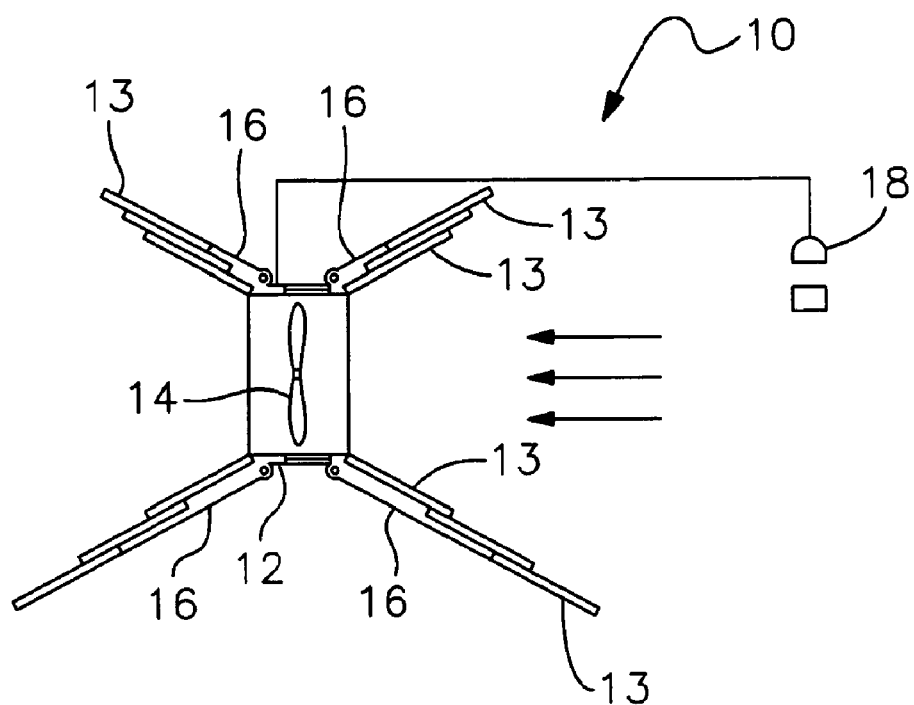
FIG. 1 illustrates a perspective view of a multidirectional hydrokinetic power generating turbine.

Referring to the figures, FIG. 1 illustrates a perspective view of a multidirectional hydrokinetic power generating turbine 10 according to a preferred embodiment of the present application. Multidirectional hydrokinetic power generating turbine 10 includes an impeller housing 12, an impeller 14 disposed within the impeller housing 14, adjustable ducts 16 pivotally connected to impeller housing 12, and a plurality of duct leafs 13 disposed about the one or more adjustable ducts 16. Duct leafs 13 articulate to cause the one or more adjustable ducts 16 to converge and diverge for selectively disposing a fluid about one or more impellers 14. Adjustable ducts 16 may be considered to be as an inflow duct or an outflow duct, depending on the direction of in which the fluid is disposed.

A sensor 18 operably associates with multidirectional hydrokinetic power generating turbine 10 to vary the positioning and/or degree of extension and retraction of adjustable ducts 16. As fluid is disposed within a proximal or distal vicinity of the multidirectional hydrokinetic power generating turbine 10, sensor 18 senses a variable within that fluid and in turn conveys a signal to a controller not shown. The controller in turn determines the appropriate orientation of adjustable ducts 16 and adjusts plurality of duct leafs 13 to correspond to the determination. Each of adjustable ducts 16 may be separately controlled. By controlling ducts separately, the shape of both inlet and outlet nozzles may be operated independent of one another. Controllers may either be automated or manual, and may be driven by a computer or a human. In the preferred embodiment the controller is a servo motor.

Sensor 18 may be of any of a variety of sensors to measure ambient conditions to control the operation of the ducts such as pressure, pressure drop, water velocity, temperature, change in rate, maximum and minimum flow speeds, and other flow characteristics. Sensor 18 may also be operatively associated with at least one impeller in that when sensor 18 detects a shift in a variable of a flow or fluid, one or more impellers 14 may alter in shape or form. Impeller 14 is capable of changing shape either through mechanical means or through material composition. For example electro-organic materials or piezoelectric materials can be controlled in such a way that inputs such as pressure, pressure drop, velocity, temperature, or any other variable can cause the material composition of impeller 14 to alter shape. Similarly, an impeller blade may be separably connected to a servo motor and may rotate to deflect or encompass a greater amount of fluid depending on shift detected by sensor 18. A change in the shape of impeller 14 or adjustable duct 16, be it temporary or permanent, may also be induced through an ion pasteurized control system, heating, cooling, reacting, or via any other detectable change in a variable that is known to one skilled in the material science and mechanical arts. Accordingly, the blades of both impeller 14 and adjustable duct 16 can have variable pitch blades which can be set using manual or automatic controls as desired. In an alternative embodiment sensor(s) 18 may be located outside the impeller housing, on the impeller, along an edge of a duct leaf 13, or at any other location, so long as sensor(s) 18 may convey a message to a controller.

In an embodiment of the present invention, the plurality of duct leafs 13 may be arranged in a circumferential manner to surround one or more adjustable ducts 16. As each duct leaf 13 is individually adjusted various arrays and fluid flows may be created. If all duct leafs 13 are the same length, as one duct leaf 13 articulates varying ranges of motion, it does not extend to the same length as another duct leaf 13. As each duct leaf 13 articulates through a range of motion, both the fluid amount and direction entering and exiting an adjustable duct 16 can be controlled. For example, in the event that a user wishes to limit the amount of flow entering adjustable duct 16, the plurality of duct leafs 13, may articulate towards one another. As the plurality of ducts articulate towards one another, adjustable duct 16 contracts and allows less fluid to enter multidirectional hydrokinetic power generating turbine 10. Alternatively, if a user wishes to increase the amount of fluid entering adjustable duct 16, the plurality of duct leafs 13 may articulate away from one another. As the plurality of duct leafs 13 articulate away from one another, adjustable duct 16 expands and becomes susceptible to receiving a larger amount of fluid. Accordingly, an unlimited amount of flow regimes may be created in this manner.

In alternative embodiments the entire direction of an adjustable duct 16 may be altered by manipulating ducts leafs 13. Accordingly, if a user desires to adjust the fluid entrance or exit to between zero and seventy five degrees, several duct leafs 13 may articulate towards the center of multidirectional hydrokinetic power generating turbine 10, while other duct leafs 13 articulate away from the center, all while maintaining a circumferential pattern. By allowing duct leafs 13 to simultaneously articulate in different directions, while disposed about adjustable duct 16, almost any fluid may be disposed in a desired flow regime. In the preferred embodiment, a fluid vector can be created by allowing fluid to enter multidirectional hydrokinetic power generating turbine 10 at any angle between fifteen to thirty degrees of motion.

Not only may duct leafs 13 be coordinated to contract and expand, but numerous vectors may be created through positioning both individual and groups of duct leafs 13. A fluid vector may created by disposing duct leafs 13 in various arrays. By dynamically positioning duct leafs 13 in numerous positions, power generating turbine 10 can create a virtually unlimited number of both input and thrust vectors. For example, if one desires to increase the amount of flow rate input into multidirectional hydrokinetic turbine 10 moving in a substantially perpendicular direction, duct leafs 13 may be coordinated to change direction and align substantially adjacent to the direction of the flow. Alternatively, if too much flow is entering or exiting multidirectional hydrokinetic turbine duct leafs 13 may be coordinated to change direction to align in a direction which limits the amount of fluid entry.

Furthermore duct leafs 13 may be positioned in a manner that expels fluids in a certain direction to create thrust vectors. Once a fluid has entered multidirectional hydrokinetic turbine 10, its expulsion pattern may be controlled by positioning both individual and groups of duct leafs 13. For example, if one wishes to divert flow in a certain direction, a input duct can be positioned to input fluid, while the outflow duct can be positioned to dispel fluid in a direction of ones choosing. Further, as the fluid is being dispelled, duct leafs 13, may coordinate with one another and move in a pattern that dispels fluid as needed.

Figure 2:
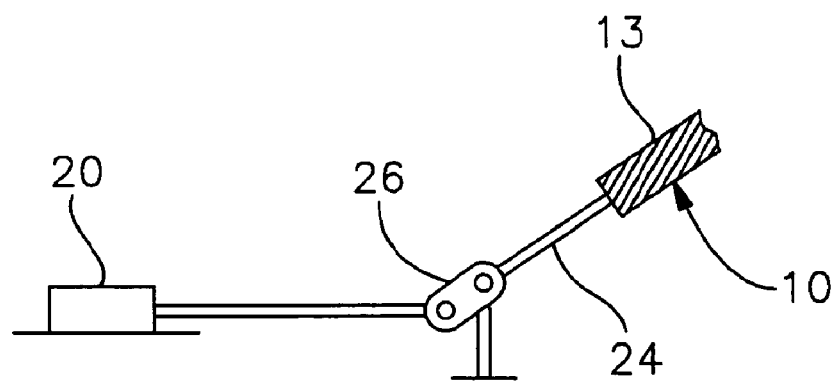
FIG. 2 illustrates a cross sectional view of a portion of a multidirectional hydrokinetic power generating turbine displayed in FIG. 1, while coupled to an automated controller via a control arm, and a pivoting mechanism.

Referring now to FIG. 2, a cross sectional view of a portion of a duct leaf 13 coupled to an automated controller 20 via a control arm 24, and a pivoting mechanism 26 is illustrated according to an embodiment of the present application. Controller 20 calculates the preferred positioning of one or more adjustable ducts 16 to attain optimal efficiency of multidirectional hydrokinetic power generating turbine 10. Controller 20 in turn adjusts the degree of articulation of duct leaf 13 via control arm 24 and pivoting mechanism 26. Control arm 24, may be coupled to only a portion of a duct leaf 13 via an attachment point. Once controller 20 determines the correct articulation that should be conveyed to duct leaf 13, controller 20 articulates pivoting mechanism 26. Pivoting mechanism 26 in turn pivots which causes articulation of control arm 24. Duct leaf 13 in turn articulates due to its attachment to control arm 24.

Figure 3A:
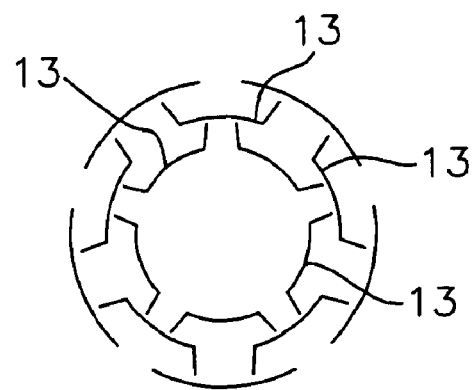
FIGS. 3A and 3B illustrate a cross sectional cutout portion of several leafed arrays of adjustable ducts.

Referring now to FIG. 3A, a cross sectional cutout portion of several arrays of duct leafs 13 are depicted according to an embodiment of the present invention. The arrays of duct leafs 13 may optionally interlock with one another. In this particular embodiment, the leafed ducts are multi-tiered, staggered, and are capable of interlocking with one another to adjust the amount of flow imposed upon an impeller. Duct leafs 13 may be controlled via an automatic or manual controller that connects through a control arm via an attachment point. Additionally, duct leafs 13 are be dynamically adjustable while a fluid is disposed in their vicinity.

Figure 3B:
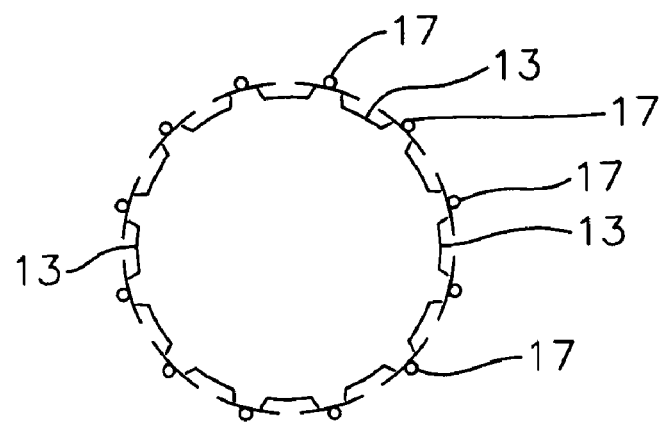
Figure 3C:
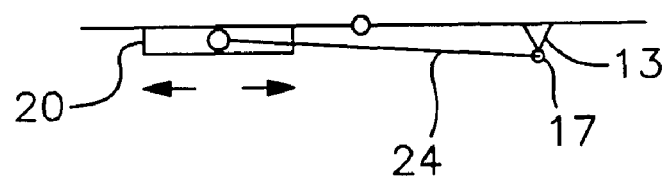
FIG. 3C illustrates cross sectional of a duct leaf having attachment point to a control mechanism.

Referring now to FIGS. 3B and 3C, cross sectional cutout portion of an array of duct leafs 13 is depicted having attachment points 17. FIG. 3B illustrates, attachment points 17 are positioned about a center of each duct leaf 13 so that adjustable duct may interlock with an adjacent duct leaf 13. FIG. 3C illustrates an automated controller 20, a duct leaf 13, a controlling arm 24, and an attachment point 17. In an alternative embodiment attachment points 17 may be positioned about any point of duct leafs 13 in order to control the direction in which each duct leaf 13 may interlock with another duct leaf 13. For example, in an alternative embodiment one duct leaf 13 may have an attachment point 17 positioned at the far left, while another duct leaf 13 has an attachment point 17 positioned at the far right. Similarly, each duct leaf 13 may vary in the direction in which it interlocks with another duct leaf 13. For example duct leafs 13, may be capable of interlocking in multi-rotational fashion, i.e. clockwise or counterclockwise as illustrated in FIG. 3B. Alternatively, duct leaf 13 may be capable of interlocking in a constrained rotation, i.e. only clockwise or only counterclockwise. It is important to understand that in each embodiment of the present application, each duct leaf 13 need not be the same as duct leaf 13. For example, one duct leaf 13 may have an attachment point 17 at the center, while another duct leaf 13 has an attachment point 17 along a far left edge.

Figure 4:
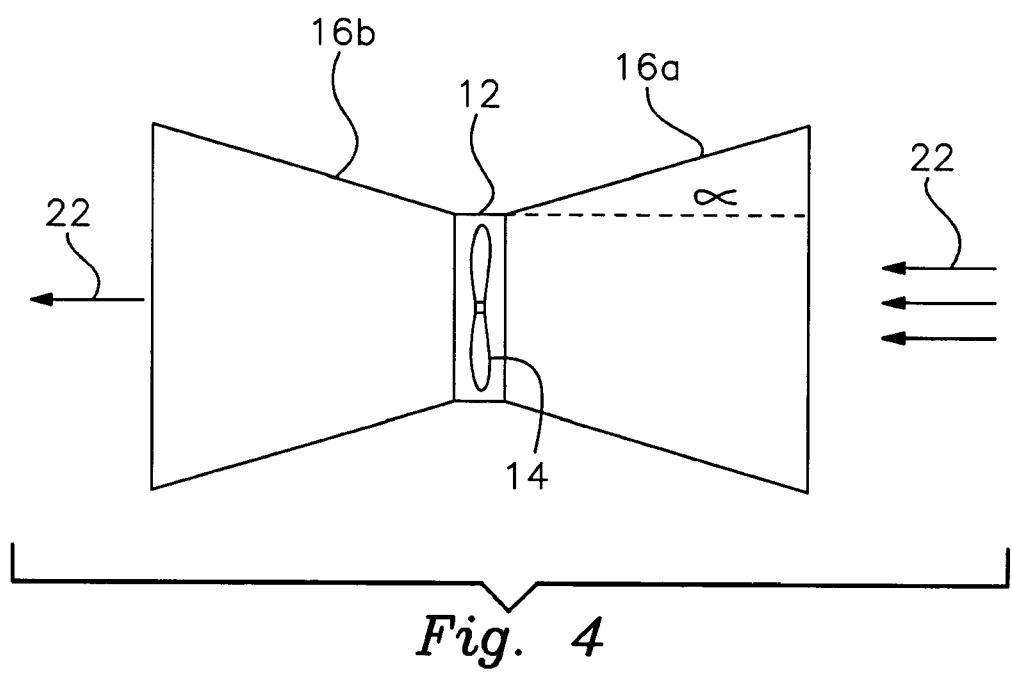
FIGS. 4, 5A, and 5B illustrate alternative configurations of the multidirectional hydrokinetic power generating turbine as illustrated in FIG. 1.
Figure 5A:
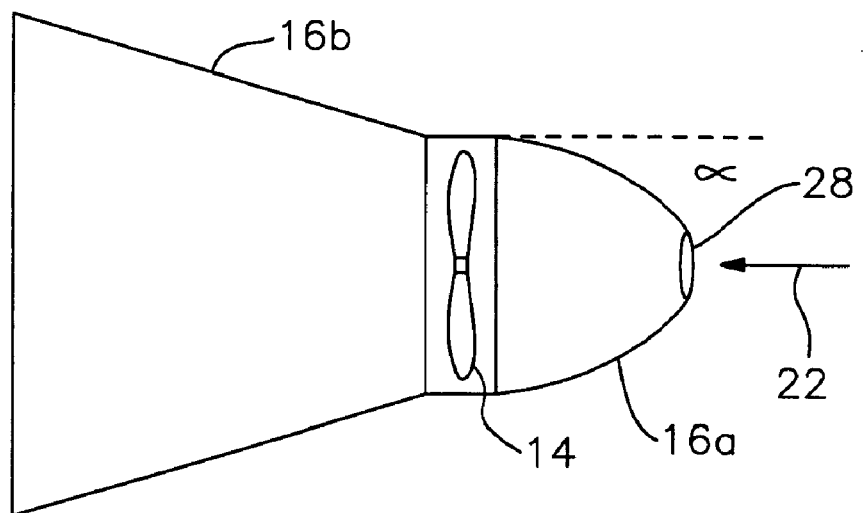
Figure 5B:
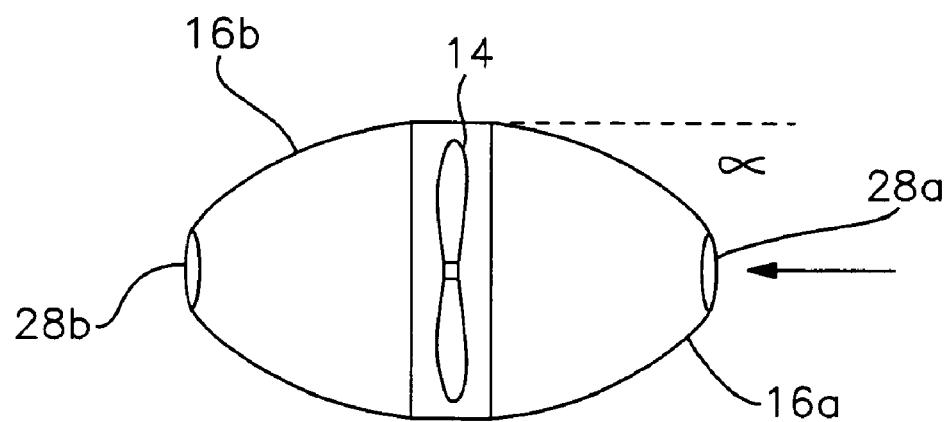

Referring now to FIGS. 4, 5A, and 5B, alternative configurations of multidirectional hydrokinetic power generating turbine 10 as illustrated in FIG. 1 are depicted. FIG. 4 depicts an embodiment in which adjustable ducts 16a and 16b diverge from impeller 14 as measured by angle alpha. Adjustable duct 16a serves as an inlet duct, while adjustable duct 16b serves as an outlet duct, as determined by disposal fluid 22 across multidirectional hydrokinetic power generating turbine 10. Impeller 14 is disposed within impeller housing 12. Though this particular embodiment illustrates a single impeller 14, in alternative embodiments one or more than one impellers 14 may be employed. Additionally in alternative embodiments when additional impellers 14 are employed, each impeller may rotate in different directions. For example one impeller 14 may rotate in a clockwise fashion, while another rotates in a counterclockwise fashion.

In operation as fluid flow 22 enters adjustable duct 16a, fluid 22 converges as it approaches impeller 14 and impeller housing 12. The convergence of fluid flow 22 causes additional pressure to be exerted on impeller 14 and in turn transfers additional energy to impeller 14 and causing impeller 14 to rotate at a greater rate than if fluid flow 22 did not converge. As fluid flow 22 is dispelled past impeller 14 through adjustable duct 16b, fluid flow 22 diverges along the expansion of adjustable duct 16b and begins flows at a slower rate.

FIG. 5A illustrates adjustable duct 16a articulated inwards and partially collapsed at angle alpha to establish a nozzle 28 while adjustable duct 16b articulated outwards and partially expanded. In operation as fluid 22 is exerted towards the nozzle, adjustable duct 16a the convergence of adjustable duct 16 causes a pressure buildup along at the nozzle 28. As fluid 22 surpasses nozzle, additional pressure is transmitted towards impeller 14 in order to create a greater amount of rotation than would otherwise amount if adjustable duct 16a was oriented parallel to fluid flow 22.

FIG. 5B illustrates adjustable ducts 16a and 16b pivoted inwards and partially collapsed at angle alpha to establish nozzles 28a and 28b. In operation, as fluid flow 22 approaches nozzle 28a, additional pressure is conveyed towards nozzle 28b. Due to adjustable duct 16b being articulated inwards and partially collapsed to establish nozzle 28b, a greater pressure is maintained within multidirectional hydrokinetic power generating turbine 10 creating an even greater amount of flow to be forced towards impeller 14 than would otherwise occur as illustrated by FIG. 5A. Adjustable ducts 16a and 16b may be defined by any of a variety of functions including a frustoconical shape, parabolic curve, square to circular cone and other configurations. The interior of the cone may also be contoured with grooves or other depressions or extensions, fins etc. to facilitate flow. In some cases, rifling on the inside of the cone may be used to enhance flow.

FIGS. 4, 5A, and 5B illustrate only several of configurations that multidirectional hydrokinetic power generating turbine 10 and its adjustable ducts 16 may take. In alternative embodiments, adjustable flow ducts 16a and 16b may be fully or partially diverged or converged. Further in alternative configurations, multiple adjustable flow ducts 16 maybe located both before and after impeller 14. In yet other configurations, a multidirectional hydrokinetic power generating turbine may have one, two, or any other number of adjustable ducts 16 before, after, in front, or behind impeller 14. Alternatively in other embodiments, impeller housing 12 may encompass more than one impeller 14. Further, each impeller 14 need not be the same size other impellers 14. In yet other embodiments, impellers 14 may be mounted outside of impeller housing 12. Angle alpha can represent the curvature of a plane of fluid formed by lines, because engineered curvatures can increase the overall efficiency and power generation of the unit.

Figure 6A:
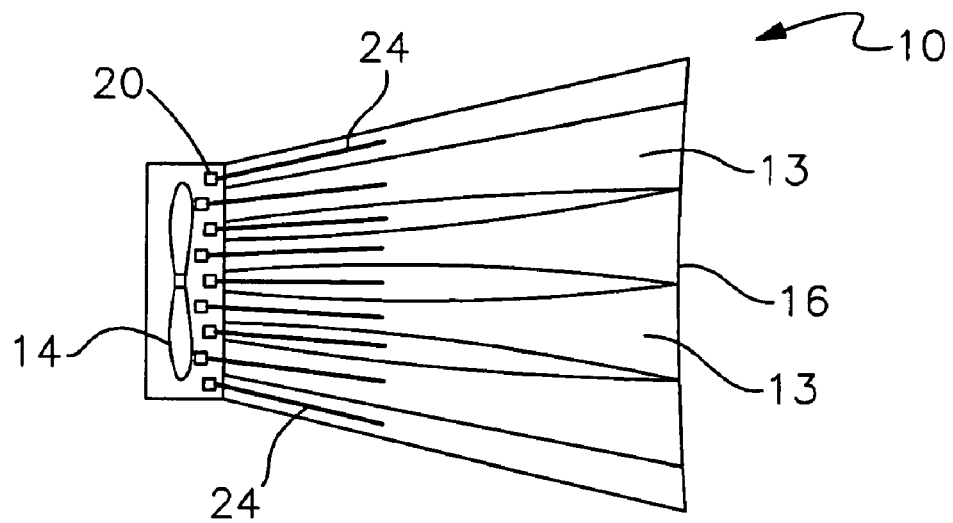
FIGS. 6A and 6B illustrate side views of multidirectional hydrokinetic power generating turbine which shows expanded and retracted positions of adjustable ducts.
Figure 6B:
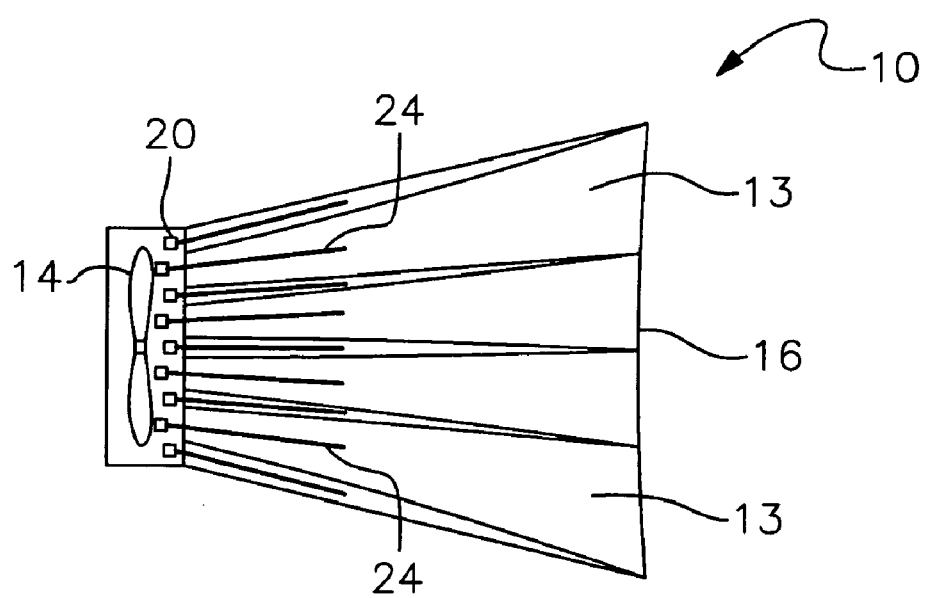

Referring now to FIGS. 6A and 6B, side views of multidirectional hydrokinetic power generating turbine 10 are depicted to show expanded and retracted positions of adjustable ducts 16. Controlling arms 24 attach controllers 20 to adjustable ducts 16. Controllers 20 move adjustable ducts 16 through controlling arms 24 which are attached to duct leafs 13. Duct leafs 13 articulate adjustable ducts 16 to establish various nozzling positions and in turn control the disposal and amount of a fluid imposed upon impeller 14. Depending on disposal of fluid imposed upon impeller 14, controllers 20 may articulate adjustable ducts 16 via duct leafs 13 to establish various flows that converge and diverge. In alternative embodiments multidirectional hydrokinetic power generating turbine 10 need not me composed entirely of adjustable flow ducts 16 or duct leafs 13. In some embodiments several flow ducts 16 may be fixed while other flow ducts 16 may be adjustable. In yet other embodiments several duct leafs 13 may be fixed while other duct leafs 13 are adjustable. In operation, duct 16 may be angled upward, downward, or side to side to meet the optimal flow direction present at any one time.

Figure 7A:
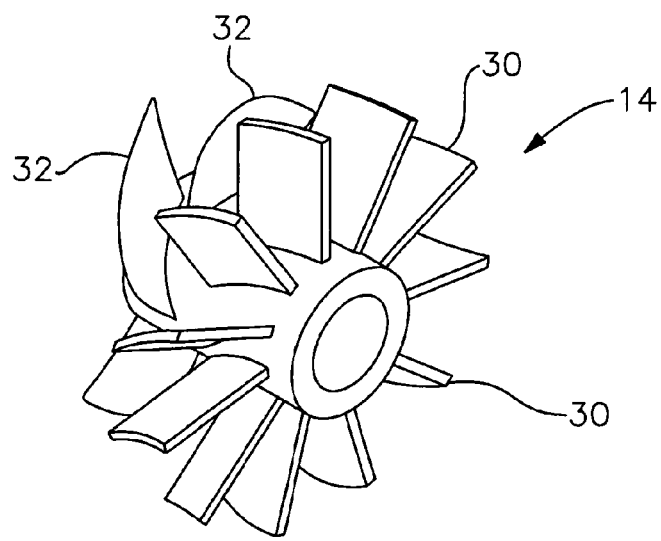
FIGS. 7A, 7B, and 7C illustrate perspective, frontal, and rear views of alternative embodiments of the impeller 14 respectively, as shown in FIG. 1.
Figures 7B, 7C:
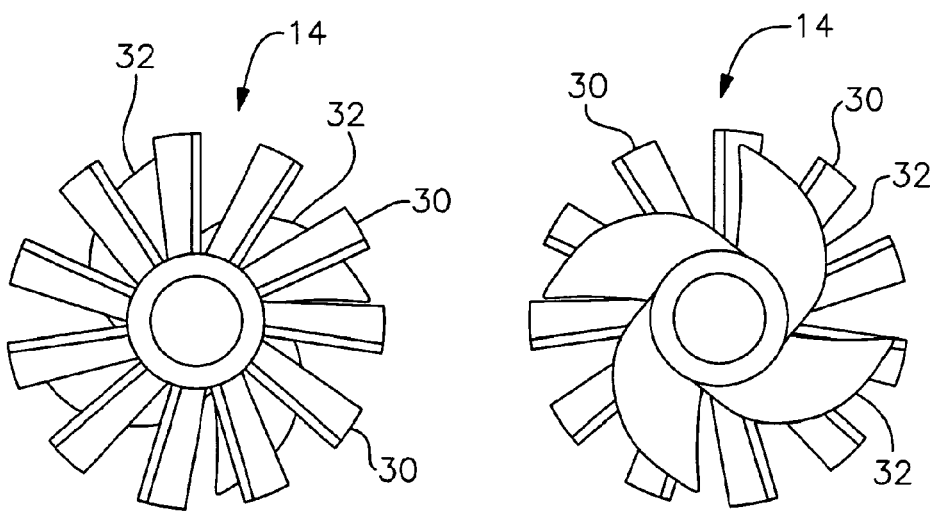

Referring now to FIGS. 7A, 7B, and 7C perspective, frontal, and rear views of alternative embodiments of impeller 14 are illustrated respectively. Impeller 14 may include both rotors 32 and stators 30. Stators 30 may be either be "swirl" inducing or "non swirl" inducing. Stators 30 provide added control of pressure drop recovery after rotors 32 which allows for higher efficiency and power output. Stators 30 induce a "swirl" in the flow field which also enhances the power production above and beyond "non swirl" stators 30 and can be as high as 30% to 50% more than a non-swirl stator. Alternative preferred embodiments include stators 30 (non swirl and swirl) in a multidirectional hydrokinetic power generating turbine where stators 30 are used for other purposes than just the mechanical support of the shaft. Impeller 14 may be bottom mounted, piling mounted or suspended from the surface or positively buoyant and anchored/moored to the bottom, or in converging/diverging nozzles, in single or dual ducts or without a duct. The blades of both rotors 32 and stators 30 may include variable pitch blades which can be set using manual or automatic controls as desired.

In the present embodiment, rotors 32 may be considered to be oriented in a counterclockwise fashion while stators 30 may be considered to be oriented in a clockwise fashion. However, in alternative embodiments, rotors 32 and stators 30 may be positioned in an alternative fashion. For example rotors 32 may be oriented in a clockwise fashion while stators 30 may be oriented in a counterclockwise fashion.

Multi directional hydro kinetic turbines and impeller housing may be designed such that the turbine rotor and impeller housing can be raised and lowered to change the vertical position of the dual ducted multidirectional hydro kinetic turbines, without necessity for removal from an active fluid or removal from service. The benefit of this is that if a high speed flow changes to a vertical orientation the multidirectional hydro kinetic turbines can reposition to absorb a maximum amount of energy. Multidirectional hydro kinetic turbines may be bottom mounted, piling mounted or suspended from a surface or positively buoyant and anchored/moored to a surface, while having converging/diverging nozzles and including single or dual adjustable ducts or alternatively include an impeller without an impeller housing in a fluid flow.

The components of multidirectional hydrokinetic power generating turbine 10 may be made from a wide variety of materials. These materials may include metallic or non-metallic, magnetic or non-magnetic, elastomeric or non-elastomeric, malleable or non-malleable materials. Non-limiting examples of suitable materials include metals, plastics, polymers, wood, alloys, composites, memory alloys, magnetorheologic fluids, shape memory polymers, dynamic composites, syntactic foams, self healing polymers and coating, styrene acrylates, cyanate esters, epoxy polymer systems, laminates, resins, elastane yarns, copolyester elastomer, thermoplastic polyurethanes, and the like. The metals may be selected from one or more metals, such as steel, stainless steel, aluminum, titanium, nickel, magnesium, or any other structural metal. Examples of plastics or polymers may include, but are not limited to, nylon, polyethylene (PE), polypropylene (PP), polyester (PE), polytetraflouroethylene (PTFE), acrylonitrile butadiene styrene (ABS), polyvinylchloride (PVC), or polycarbonate and combinations thereof, among other plastics. The multidirectional hydrokinetic power generating turbine and its various components may be molded, sintered, machined and/or combinations thereof to form the required pieces for assembly. Additionally, turbines using this system may be vertical axis rotor turbines, including but not limited to a helical turbine, a darrius turbine, or any other variety of turbine configurations.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A hydropower generating turbine comprising:
an impeller housing disposed to receive water;
at least one impeller disposed within the impeller housing;
at least one adjustable duct pivotally connected to the impeller housing; and
said duct comprising a plurality of duct leafs;
wherein the plurality of duct leafs articulate and cause said duct to converge and diverge for selectively disposing a fluid about said impeller.

2. The hydropower generating turbine of claim 1, wherein said duct is an inflow duct.

3. The hydropower generating turbine of claim 1, wherein said duct is an outflow duct.

4. The hydropower generating turbine of claim 1, wherein said impeller reacts to a change in the fluid and alters shape of said impeller.

5. The hydropower generating turbine of claim 1, further comprising a sensor operatively associated with said impeller; wherein the sensor detects a shift in fluid disposal and causes said impeller to alter shape.

6. The hydropower generating turbine of claim 1, wherein said duct reacts to a change in the fluid and alters the shape of the duct.

7. The hydropower generating turbine of claim 1, further comprising a sensor operatively associated with said duct; wherein the sensor detects a shift in fluid disposal and causes said duct to alter shape.

8. The hydropower generating turbine of claim 1, wherein at said duct is dynamically adjustable.

9. A power generating turbine of claim 1 further comprising:
an axial member having an inner circumference and an outer circumference;
one or more rotors circumferentially movably mounted along an outer circumference of the axial member;
one or more stators tangentially movably disposed about the one or more impellers; and
wherein the one or more stators increase fluid disposed towards the one or more rotors.

10. The hydropower generating turbine of claim 9, wherein the one or more stators and the one or more rotors are oriented in opposing directions.

11. A hydropower generating turbine comprising:
one or more impellers;
one or more pivoting mechanisms;
one or more adjustable ducts operatively associated with the one or more impellers;
one or more control arms operably coupled to the one or more adjustable ducts;
wherein the one or more pivoting mechanisms provides for convergence and divergence of the one or more adjustable ducts; and
wherein movement of said control arm induces a response from the one or more adjustable ducts.

12. The hydropower generating turbine of claim 11, further comprising:
one or more automated controllers connected to the one or more control arm,
wherein movement of an automated controller causes a response from the one or more adjustable ducts.

13. The hydropower generating turbine of claim 12, wherein the one or more automated controllers are electrically interconnected for coordinating the one or more control arms.

14. The hydropower generating turbine of claim 12, wherein the automated controller is a servo motor.

15. The hydropower generating turbine of claim 12, further comprising one or more sensors operatively associated with the automated controller, wherein a variable change in the flow is detected by the sensor and transmitted to the automated controller to cause a change in the impeller.

16. The hydropower generating turbine of claim 12, further comprising:
one or more sensors operatively associated with the automated controller,
wherein a variable change in the flow is detected by the sensor and transmitted to the automated controller to cause a change in the at least one adjustable duct.

17. The hydropower generating turbine of claim 12, further comprising:
one or more sensors operatively associated with the automated controller, wherein a variable change in the flow is detected by the sensor and transmitted to the automated controller to cause a directional shift in the multidirectional turbine.

18. The hydropower generating turbine of claim 15, further comprising one or more sensors operatively associated with the automated controller, wherein a variable change in the flow is detected by the sensor to cause a directional shift in the impeller.

19. The hydropower generating turbine of claim 16, further comprising:
one or more sensors operatively associated with the automated controller,
wherein a variable change in the flow is detected by the sensor to cause a directional shift in the adjustable duct.

20. The hydropower generating turbine of claim 11, wherein the one or more adjustable ducts extend and retract to influence a variable of the flow imposed on the at least one impeller.

* * * * *